United States Patent [19]

Tabata et al.

[11] Patent Number: 5,185,311
[45] Date of Patent: Feb. 9, 1993

[54] CATALYTIC COMPOSITE FOR PURIFYING EXHAUST GASES AND A METHOD FOR PREPARING THE SAME

[75] Inventors: Kenji Tabata; Ikuo Matsumoto, both of Ikoma; Hiroshi Fukuda, Nara, all of Japan

[73] Assignee: Matsushita Electric Industrial Co., Ltd., Osaka, Japan

[21] Appl. No.: 700,685

[22] Filed: May 15, 1991

[51] Int. Cl.$^5$ .................... B01J 23/10; B01J 23/44
[52] U.S. Cl. .................... 502/304; 502/303; 502/324; 502/327; 502/333; 502/336; 502/338; 502/339; 502/525; 423/213.2; 423/213.5
[58] Field of Search ........... 502/303, 304, 324, 326, 502/327, 333, 525, 336, 338, 339; 423/213.2, 213.5

[56] References Cited

U.S. PATENT DOCUMENTS

| | | | |
|---|---|---|---|
| 3,897,367 | 7/1975 | Lauder | 252/462 |
| 4,492,770 | 1/1985 | Blanchard et al. | 502/304 |
| 4,613,583 | 9/1986 | Koch et al. | 502/525 |
| 4,812,300 | 3/1989 | Quinlan et al. | 423/404 |
| 4,849,398 | 7/1989 | Takada et al. | 502/303 |
| 5,057,482 | 10/1991 | Fukuda et al. | 502/525 |
| 5,093,301 | 3/1992 | Chu et al. | 502/525 |

FOREIGN PATENT DOCUMENTS

| | | | |
|---|---|---|---|
| 0089193 | 9/1983 | European Pat. Off. . | |
| 1234947 | 10/1986 | Japan | 502/525 |
| 2225250 | 10/1987 | Japan . | |
| 2269747 | 11/1987 | Japan | 502/525 |
| 1307447 | 12/1989 | Japan | 502/525 |
| 1307452 | 12/1989 | Japan | 502/525 |
| 3077644 | 3/1991 | Japan . | |

Primary Examiner—Anthony McFarlane
Attorney, Agent, or Firm—Panitch Schwarze Jacobs & Nadel

[57] ABSTRACT

For the preparation of a catalytic composite for purifying exhaust gases, first, at least one perov-skite-type compound oxide of the formula $RMO_3$, where R is La or a combination of La and Ce, and M is Co, Mn or a combination thereof, is supported together with cerium dioxide and alumina sol on a heat resistant carrier made of an inorganic oxide selected from the group consisting of cordierite and mullite, and then iron and palladium are further supported together thereon. As a result, a catalytic composite having a high degree of oxidation activity at low temperatures and also having excellent heat resistance can be obtained.

7 Claims, No Drawings

CATALYTIC COMPOSITE FOR PURIFYING EXHAUST GASES AND A METHOD FOR PREPARING THE SAME

BACKGROUND OF THE INVENTION

1. Field of the Invention:

The present invention relates to a catalytic composite for purifying exhaust gases and a method for preparing the catalytic composite. More particularly, it relates to a catalytic composite capable of completely burning unburnt portions of hydrocarbons and carbon monoxides released from various kinds of combustion equipment so as to decompose them into carbon dioxide and water.

2. Description of the Prior Art:

As an oxidation catalytic composite which converts hydrocarbon and carbon monoxide into carbon dioxide and steam in the coexistence of air, there is, for example, a catalytic composite including a catalyst made of a metal of the platinum group such as platinum, palladium or rhodium and also including a heat resistant material made of alumina, silica, or the like on which the catalyst is supported. It is known that this catalytic composite has a high degree of oxidation activity. Thus, it is widely used as a catalytic composite for purifying exhaust gases.

Base metals such as cobalt, nickel and iron are also used as a catalyst in the catalytic composite for purifying exhaust gases. In recent years, however, research has been conducted to develop catalysts made of compound oxides including a plurality of base metals, rather than catalysts of metal oxides including a single base metal. Among the compound oxides which have been developed as the catalyst, compound oxides having perovskite structures of the formula $RMO_3$ have attracted attention because they have a high degree of oxidation activity. Among the perovskite-type compound oxides, $LaCoO_3$ and $LaMnO_3$ are particularly excellent in oxidation activity. It has been reported that the oxidation activity of these perovskite-type compound oxides are further improved by replacing some of the metals at the R-sites in the compound oxides with divalent alkaline earth metals (e.g., strontium).

In general, a catalytic compound for purifying exhaust gases is used for both high-temperature combustion equipment and low-temperature combustion equipment. The temperature of the exhaust gases released from the former ranges from 700° to 800° C. while the temperature of those released from the latter ranges from 300° to 400° C. Therefore, a catalytic compound for purifying exhaust gases is required to have excellent heat resistance at a high temperature of 700° to 800° C. and excellent oxidation activity at a low temperature of 300° to 400° C. Catalysts made of perovskite-type compound oxides including base metals are generally superior in heat resistance at a temperature of 700° to 800° C., but inferior in oxidation activity at low temperatures, as compared with catalysts made of a metal of the platinum group. In order to improve the low-temperature oxidation activity, there has been proposed the addition of a small amount of metal from the platinum group to the perovskite-type compound oxides. By the addition of a small amount of metal of the platinum group, the low-temperature oxidation activity of the resulting perovskite-type compound oxide can be improved. However, when this compound oxide is heated to a temperature of 700° to 800° C., the metal of platinum group added thereto deteriorates due to the high temperature, thereby reducing the degree of oxidation activity thereof.

SUMMARY OF THE INVENTION

The catalytic composite for purifying exhaust gases of this invention, which overcomes the above-discussed and numerous other disadvantages and deficiencies of the prior art, comprises: a heat resistant carrier made of an inorganic oxide selected from the group consisting of cordierite and mullite; at least one perovskite-type compound oxide of the formula $RMO_3$, where R is La or a combination of La and Ce, and M is Co, Mn or a combination thereof; cerium dioxide; alumina sol; iron; and palladium, the perovskite-type compound oxide, the cerium dioxide, the alumina sol, the iron and the palladium all being supported on the heat resistant carrier.

In a preferred embodiment, the perovskite-type compound oxide is of the formula $La_{0.9}Ce_{0.1}CoO_3$ and the heat resistant carrier is made of cordierite.

In another preferred embodiment, the perovskite-type compound oxide is of the formula $LaCo_{0.8}Mn_{0.2}O_3$ and the heat resistant carrier is made of mullite.

In another preferred embodiment, the cerium dioxide contains zirconium dioxide.

A method for preparing a catalytic composite for purifying exhaust gases of this invention comprises the steps of: (a) supporting at least one perovskite-type compound oxide of the formula $RMO_3$, where R is La or a combination of La and Ce, and M is Co, Mn or a combination thereof, cerium dioxide, and alumina sol on a heat resistant carrier made of an inorganic oxide selected from the group consisting of cordierite or mullite; and (b) supporting iron and palladium on the carrier obtained in the step (a).

In a preferred embodiment, the perovskite-type compound oxide, the cerium dioxide and the alumina sol are supported by immersing the carrier in a slurry containing a mixture of the perovskite-type compound oxide, cerium dioxide and alumina sol.

In a preferred embodiment, the iron and the palladium are supported by immersing the carrier obtained in the step (a) in a solution of palladium nitrate and ferric nitrate.

Thus, the invention described herein makes possible the objectives of (1) providing a catalytic composite for purifying exhaust gases, which has a high degree of oxidation activity at low temperatures and excellent heat resistance; and (2) providing a method for preparing a catalytic composite for purifying exhaust gases which has a high degree of oxidation activity at low temperatures and excellent heat resistance.

DESCRIPTION OF THE PREFERRED EMBODIMENTS

A catalytic composite for purifying exhaust gases according to the present invention includes at least one perovskite-type compound oxide of the formula $RMO_3$ (where R is La or a combination of La and Ce, and M is Co, Mn or a combination thereof), cerium dioxide, alumina sol, iron, and palladium all supported on a heat resistant carrier made of an inorganic oxide selected from the group consisting of cordierite or mullite. For the preparation of the catalytic composite, the perovskite-type compound oxide, the cerium dioxide and the alumina sol are first supported on the inorganic heat resistant oxide carrier, and thereafter, the palladium and the iron are further supported together thereon. As a result, the iron is combined with the palladium to form a compound, thereby preventing the palladium from scattering into other components or from being sintered at high temperatures. Also because of the formation of the compound, the iron does not affect the oxidation activity of the palladium. Therefore, the catalytic composite of the present invention has a high degree of oxidation activity at low temperatures and excellent heat resistance, so that it can be used for purifying gases in a wide range of temperatures, i.e., in the range of 300° to 900° C.

The present invention will be further described by reference to the following examples.

EXAMPLE 1

First, an inorganic heat resistant oxide carrier having a honeycomb structure made of cordierite (400 cell/inch$^2$) was immersed in a slurry containing a mixture of perovskite-type compound oxide ($La_{0.9}Ce_{0.1}CoO_3$), cerium dioxide ($CeO_2$), and alumina sol. The cerium dioxide in the slurry may contain zirconium dioxide. The inorganic heat resistant oxide carrier was then taken out of the slurry, and dried. In this way, the mixture of perovskite-type compound oxide, cerium dioxide and alumina sol was applied to the inorganic heat resistant oxide carrier. After the drying, the carrier having the mixture thereon was calcined at a temperature of 800° C. The content of the mixture in the resultant calcined carrier was 10 wt %.

Next, the calcined carrier was immersed in a solution of palladium nitrate and ferric nitrate (Pd:Fe=1:2). The calcined carrier was then taken out of the solution, and dried. In this way, palladium and iron were applied to the calcined carrier. After the drying, the calcined carrier with the palladium and iron thereon was further calcined at a temperature of 600° C., resulting in a catalytic composite. The solution of palladium nitrate and ferric nitrate was prepared to contain palladium at such a concentration that the content of palladium in the resulting catalytic composite would be 500 mg/l.

The oxidation activity of the thus prepared catalytic composite was evaluated by a fixed bed flow system using a gas containing carbon monoxide at a concentration of 0.1% (air balance) under the condition of space velocity of 10,000 h$^{-1}$. After a sample of the catalytic composite was maintained at a temperature of 900° C. for 50 hours in an electric furnace, the evaluation was carried out. As a result, the oxidation activity was 75.2% at a temperature of 140° C.

For the purpose of comparison, a catalytic composite was produced in the same manner as described above except that palladium alone was applied onto the calcined carrier. The content of the palladium in the resulting catalytic composite was also 500 mg/l. The oxidation activity of this catalytic composite was also evaluated in the same manner as described above. As a result, the oxidation activity was 16.2% at a temperature of 140° C.

EXAMPLE 2

An inorganic heat resistant oxide carrier having a honeycomb structure made of mullite (400 cell/inch$^2$) was immersed in a slurry containing a mixture of perovskite-type compound oxide ($LaCo_{0.8}Mn_{0.2}O_3$), cerium dioxide ($CeO_2$), and alumina sol. The cerium dioxide in the slurry may contain zirconium dioxide. The inorganic heat resistant oxide carrier was then taken out of the slurry, and dried. After the drying, the carrier having the mixture of the perovskite-type compound oxide, cerium dioxide and alumina sol applied thereto was calcined at a temperature of 800° C. The content of the mixture in the resultant calcined carrier was 10 wt %. Then, the calcined carrier was immersed in a solution of palladium nitrate and ferric nitrate (Pd:Fe=1:1). The calcined carrier was then taken out of the solution, and dried. After drying, the calcined carrier with palladium and iron applied thereto was further calcined at a temperature of 600° C., resulting in a catalytic composite. The solution of palladium nitrate and ferric nitrate was prepared to contain palladium at such a concentration that the content of palladium in the resulting catalytic composite would be 500 mg/l.

The oxidation activity of the thus prepared catalytic composite was evaluated in the same manner as in Example 1. After a sample of the catalytic composite was maintained at 900° C. for 50 hours in an electric furnace, the evaluation was carried out. As a result, the oxidation activity was 43.4% at a temperature of 140° C.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A catalytic composite for purifying exhaust gases, comprising: a heat resistant carrier made of an inorganic oxide selected from the group consisting of cordierite and mullite; at least one compound of the formula RMO$_3$, where R is La or a combination of La and Ce, and M is Co, Mn or a combination thereof; cerium dioxide; alumina sol; iron; and palladium, the compound RMO$_3$, the cerium dioxide, the alumina sol, the iron and the palladium all being supported on the heat resistant carrier.

2. A catalytic composite according to claim 1, wherein the compound RMO$_3$ is of the formula $La_{0.9}Ce_{0.1}CoO_3$ and the heat resistant carrier is made of cordierite.

3. A catalytic composite according to claim 1, wherein the compound RMO$_3$ is of the formula $LaCo_{0.8}Mn_{0.2}O_3$ and the heat resistant carrier is made of mullite.

4. A catalytic composite according to claim 1, wherein the cerium dioxide contains zirconium dioxide.

5. A method for preparing a catalytic composite for purifying exhaust gases, comprising the steps of: (a) supporting at least one compound of the formula RMO$_3$, where R is La or a combination of La and Ce, and M is Co, Mn or a combination thereof, cerium dioxide, and alumina sol on a heat resistant carrier made of an inorganic oxide selected from the group consisting of cordierite or mullite; and (b) supporting iron and palladium on the carrier obtained in the step (a).

6. A method according to claim 5, wherein the compound RMO$_3$, the cerium dioxide and the alumina sol are supported by immersing the carrier in a slurry containing a mixture of the compound RMO$_3$, cerium dioxide and alumina sol.

7. A method according to claim 5, wherein the iron and the palladium are supported by immersing the carrier obtained in the step (a) in a solution of palladium nitrate and ferric nitrate.

* * * * *